(12) United States Patent
Lv

(10) Patent No.: US 10,595,016 B2
(45) Date of Patent: Mar. 17, 2020

(54) CAMERA COLOR ADJUSTING METHOD AND APPARATUS

(71) Applicant: Goertek Inc., Shandong Province (CN)

(72) Inventor: Sihao Lv, Shandong Province (CN)

(73) Assignee: Goertek Inc., Shandong Province (CN)

( * ) Notice: Subject to any disclaimer, the term of this patent is extended or adjusted under 35 U.S.C. 154(b) by 0 days.

(21) Appl. No.: 16/089,472

(22) PCT Filed: Dec. 20, 2016

(86) PCT No.: PCT/CN2016/110993
§ 371 (c)(1),
(2) Date: Sep. 28, 2018

(87) PCT Pub. No.: WO2017/206489
PCT Pub. Date: Dec. 7, 2017

(65) Prior Publication Data
US 2019/0124325 A1   Apr. 25, 2019

(30) Foreign Application Priority Data

Jun. 1, 2016 (CN) .......................... 2016 1 0382857

(51) Int. Cl.
*H04N 1/60* (2006.01)
*H04N 17/02* (2006.01)
(Continued)

(52) U.S. Cl.
CPC ............. *H04N 17/002* (2013.01); *G06T 7/90* (2017.01); *H04N 1/603* (2013.01);
(Continued)

(58) Field of Classification Search
CPC combination set(s) only.
See application file for complete search history.

(56) References Cited

U.S. PATENT DOCUMENTS 9,514,535 B1 * 12/2016 Luo .................. H04N 9/045
2009/0147098 A1   6/2009 Li

FOREIGN PATENT DOCUMENTS

CN    101079950 A   11/2007
CN    101939997 A    1/2011
(Continued)

OTHER PUBLICATIONS

International Searching Authority, International Search Report (ISR) and Written Opinion for International Application No. PCT/CN2016/110993, dated Feb. 23, 2017, 10 pages, State Intellectual Property Office of the P.R.C., China.
(Continued)

*Primary Examiner* — Ahmed A Berhan
(74) *Attorney, Agent, or Firm* — Alston & Bird LLP

(57) ABSTRACT

The present invention discloses a camera color adjusting method and apparatus. The method comprises: acquiring a stored proportion coefficient of an image sensor of a camera under a light source to be tested; controlling the camera to shoot test drawings including color blocks under a predefined light source to obtain test photos under the predefined light source; acquiring RGB values of each color block in the test photos under the predefined light source; generating test photos corresponding to the light source to be tested according to the RGB values of each color block and the proportion coefficient under each light source to be tested; and performing color adjustment for the camera according to all the test photos.

7 Claims, 2 Drawing Sheets

(51) Int. Cl.
*H04N 9/73* (2006.01)
*G06T 7/90* (2017.01)
*H04N 17/00* (2006.01)

(52) U.S. Cl.
CPC .......... *H04N 1/6033* (2013.01); *H04N 9/735* (2013.01); *H04N 17/02* (2013.01); *G06T 2207/10024* (2013.01)

(56) References Cited

FOREIGN PATENT DOCUMENTS

| | | | |
|---|---|---|---|
| CN | 102137272 | A | 7/2011 |
| CN | 103763546 | A | 4/2014 |
| CN | 104104761 | A | 10/2014 |
| CN | 104104946 | A | 10/2014 |
| CN | 104897374 | A | 9/2015 |
| CN | 105391831 | A | 3/2016 |
| CN | 106060533 | A | 10/2016 |
| JP | 2010-219606 | A | 9/2010 |

OTHER PUBLICATIONS

State Intellectual Property Office of the P.R.C., Notification to Grant Patent Right for Application No. 201610382857.3, dated Jan. 9, 2018, 3 pages, China.
State Intellectual Property Office of the P.R.C., First Office Action for Application No. 201610382857.3, dated Aug. 7, 2017, 3 pages, China.
State Intellectual Property Office of the P.R.C., Search Report for Application No. 201610382857.3, dated Jul. 27, 2017, 3 pages, China.
State Intellectual Property Office of the P.R.C., Supplemental Search Report for Application No. 201610382857.3, dated Dec. 28, 2017, 3 pages, China.
International Searching Authority, Written Opinion, including English translation, for International Application No. PCT/CN2016/110993, dated Feb. 23, 2017, 5 pages, State Intellectual Property Office of the P.R.C., China.

* cited by examiner

CAMERA COLOR ADJUSTING METHOD AND APPARATUS

CROSS-REFERENCE TO RELATED APPLICATIONS

This invention is a National Stage of International Invention No. PCT/CN2016/110993, filed on Dec. 20, 2016, which claims priority to Chinese Patent Application No. 201610382857.3, filed on Jun. 1, 2016, both of which are hereby incorporated by reference in their entireties.

BACKGROUND

Technical Field

The present invention relates to the technical field of color adjustment, and more particularly, to a camera color adjusting method and apparatus.

Related Art

An existing cell phone is usually equipped with a camera. The color of the camera needs to be adjusted and optimized using color adjusting tools according to the processor and screen size of the cell phone. During adjustment, usually it is necessary to photograph 24 test drawings under a normal light source, which includes D65, TL84, AL, CWF, H light sources. This consumes much time and lowers the production efficiency.

BRIEF SUMMARY

An object of the present invention is to provide a novel technical solution capable of accelerating the color adjusting process.

According to a first aspect of the present invention, there is provided a camera color adjusting method, comprising: acquiring a stored proportion coefficient of an image sensor of a camera under a light source to be tested; controlling the camera to shoot test drawings including color blocks under a predefined light source to obtain test photos under the predefined light source; acquiring RGB values of each color block in the test photos under the predefined light source; generating test photos corresponding to the light source to be tested according to the RGB values of each color block and the proportion coefficient under each light source to be tested; and performing color adjustment for the camera according to all the test photos.

Alternatively, the method further comprises: controlling the camera to shoot the test drawings under the predefined light source and the light source to be tested respectively to obtain test photos under the predefined light source and the light source to be tested respectively; recording RGB values of a first color block in each test photo; calculating by using the RGB values of the first color block in the test photo under each light source to be tested and the RGB values of the first color block in the test photo under the predefined light source to obtain a proportion coefficient of the image sensor the camera under each light source to be tested; and storing the proportion coefficient of the image sensor of the camera under the light source to be tested.

Alternatively, calculating by using the RGB values of the first color block in the test photo under each light source to be tested and the RGB values of the first color block in the test photo under the predefined light source to obtain a proportion coefficient of the image sensor the camera under each light source to be tested comprises: taking the ratio of the RGB values of the first color block in the test photo under each light source to be tested to the RGB values of the first color block in the test photo under the predefined light source as the proportion coefficient of the corresponding light source to be tested.

Alternatively, generating test photos corresponding to the light source to be tested according to the RGB values of each color block and the proportion coefficient under each light source to be tested comprises: multiplying the RGB values of each color block by the proportion coefficient of the corresponding light source to be tested respectively to obtain RGB values of each color block under the corresponding light source to be tested; and generating the test photos corresponding to the light source to be tested according to the RGB values of each color block under the corresponding light source to be tested.

According to a second aspect of the present invention, there is provided a camera color adjusting apparatus, comprising: a proportion coefficient acquisition module configured for acquiring a stored proportion coefficient of an image sensor of a camera under a light source to be tested; a first control module configured for controlling the camera to shoot test drawings including color blocks under a predefined light source to obtain test photos under the predefined light source; an RGB values acquisition module configured for acquiring RGB values of each color block in the test photos under the predefined light source; a photo generation module configured for generating test photos corresponding to the light source to be tested according to the RGB values of each color block and the proportion coefficient under each light source to be tested; and an adjusting module configured for performing color adjustment for the camera according to all the test photos.

Alternatively, the apparatus further comprises: a second control module configured for controlling the camera to shoot the test drawings under the predefined light source and the light source to be tested respectively to obtain test photos under the predefined light source and the light source to be tested respectively; a recording module configured for recording RGB values of a first color block in each test photo; a proportion coefficient calculation module configured for calculating by using the RGB values of the first color block in the test photo under the light source to be tested and the RGB values of the first color block in the test photo under the predefined light source to obtain a proportion coefficient of the image sensor the camera under the light source to be tested; and a storage module configured for storing the proportion coefficient of the image sensor of the camera under the light source to be tested.

Alternatively, the proportion coefficient calculation module is configured for: taking the ratio of the RGB values of the first color block in the test photo under each light source to be tested to the RGB values of the first color block in the test photo under the predefined light source as the proportion coefficient of the corresponding light source to be tested.

Alternatively, the photo generation module comprises: an RGB values calculation unit configured for multiplying the RGB values of each color block by the proportion coefficient of the corresponding light source to be tested respectively to obtain RGB values of each color block under the corresponding light source to be tested; and a photo generation unit configured for generating the test photos corresponding to the light source to be tested according to the RGB values of each color block under the corresponding light source to be tested.

According to a third aspect of the present invention, there is provided a computer readable storage medium storing program codes for performing the method according to the first aspect of the present invention.

The inventors of the present invention have found that in the prior art, in the camera color adjusting process, photos need to be shoot under different light sources, which consumes much time and lowers the adjusting efficiency. In the present invention, by using the stored proportion coefficient, test photos that would be taken under light source to be testeds can be acquired by shooting the test drawings under one light source. This accelerates the camera color adjusting process and improves the production efficiency. Therefore, the technical task to be solved by the present invention or the technical problem to be solved is never imagined or unexpected by those skilled in the art, so the present invention is a new technical solution.

Further features of the present invention, as well as advantages thereof, will become apparent from the following detailed description of exemplary embodiments of the present invention with reference to the attached drawings.

BRIEF DESCRIPTION OF THE FIGURES

The accompanying drawings, which are incorporated in and constitute a part of the specification, illustrate embodiments of the present invention and, together with the description, serve to explain the principles of the present invention.

DETAILED DESCRIPTION OF THE VARIOUS EMBODIMENTS

Various exemplary embodiments of the present invention will now be described in detail with reference to the accompanying drawings. It should be noted that the relative arrangement of the components and steps, numerical expressions and numerical values set forth in these embodiments do not limit the scope of the present invention unless it is specifically stated otherwise.

The following description of at least one exemplary embodiment is merely illustrative in nature and by no means is to be construed as any limitation on the invention and its application or use.

Techniques, methods, and apparatuses known to one of ordinary skill in the relevant art may not be discussed in detail but, where appropriate, the techniques, methods, and apparatuses should be considered part of the description.

In all of the examples shown and discussed herein, any specific value should be interpreted as merely illustrative and not as a limitation. Therefore, other examples of the exemplary embodiments may have different values.

It should be noted that like reference numbers and letters designate similar terms in the following figures, and therefore, an item need not be further discussed in subsequent figures as soon as an item is defined in a drawing.

In order to solve the problem in the prior art that photos are taken under different light sources during the camera color adjusting process so that much time is consumed and the adjusting efficiency is lowered, the present invention provides novel technical solutions for camera color adjustment.

Figure 1:
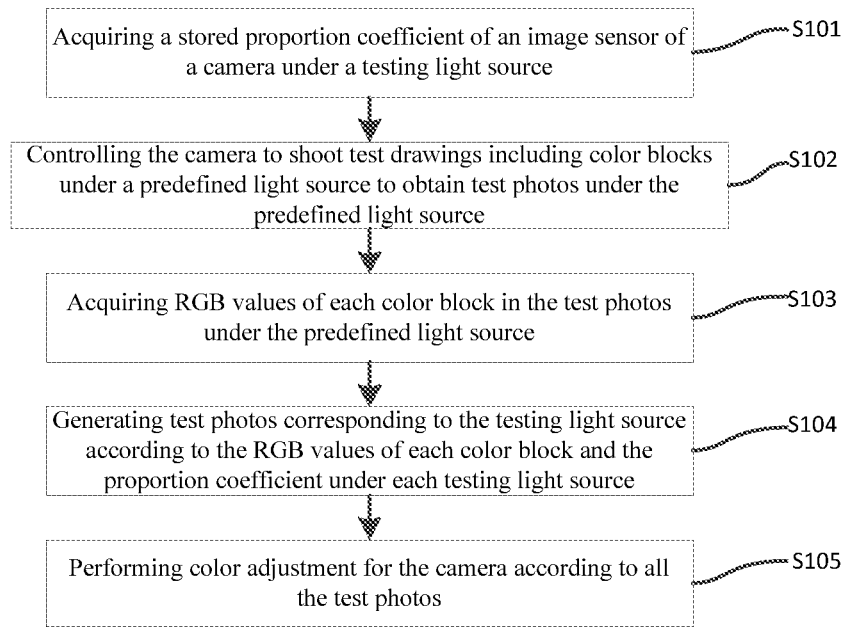
FIG. 1 is a flow chart of an implementation of a camera color adjusting method in accordance with the present invention.

FIG. 1 is a flow chart of an implementation of a camera color adjusting method in accordance with the present invention.

As shown in FIG. 1, the method comprises the following steps.

In step S101, a stored proportion coefficient of an image sensor of a camera under a light source to be tested is acquired.

Standard light sources are commonly used for color adjusting. Artificial standard light sources include the following types: international standard artificial sunlight—D65 light source, color temperature: 6500K, power: 18W; simulated northern average sunlight—D75 light source, color temperature: 7500K; simulated sunlight-D50 light source, color temperature: 5000K; simulated European store lighting—TL84 light source, color temperature: 4000K, power: 18W; simulated US store lighting—CWF light source, color temperature: 4100K, power: 20W; CWF-US cold white light source, color temperature: 4150K; another simulated US store lighting-U30 light source, color temperature: 3000K, power: 20W; simulated specified store lighting-U35 light source, color temperature: 3500K; U35-US retailer Target-Target designated color tube, color temperature 3500 k; simulated family hotel warm light-F lamp, color temperature: 2700K, power: 40W; simulated showroom spotlight—Inca Lamp, color temperature: 2856K; A-US kitchen window spot light, color temperature: 2856K, power: 60W; simulated horizontal daylight-Horizon, color temperature: 2300K; TL83—European standard warm white light source, color temperature: 3000K, power: 18W; and UV-UV light source, wavelength: 365 nm, power: 20W.

In the light sources used for color adjusting, one of the light sources can be predefined as a predefined light source and the others as light source to be testeds.

For example, the light source for performing color adjusting may be a D65 light source, a D75 light source, a D50 light source, a TL84 light source, an A light source, a CWF light source, a U30 light source and an H light source. In a particular embodiment of the present invention, a TL84 light source may be predefined as a predefined light source, and a D65 light source, a D75 light source, a D50 light source, an A light source, a CWF light source, a U30 light source and an H light source may be predefined as light source to be testeds.

Since the same image sensor has the same proportion coefficient under the light source to be tested, if the same image sensor is stored with a proportion coefficient under the light source to be tested, this proportion coefficient can be used directly.

Figure 2:
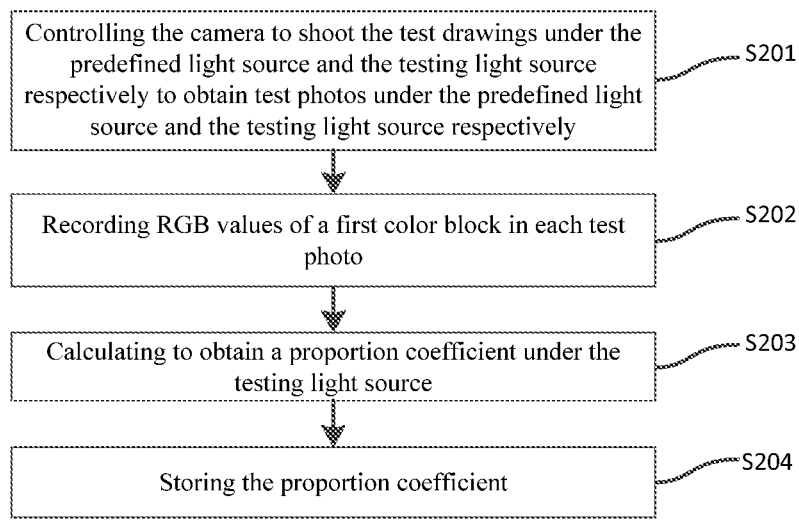
FIG. 2 is a flow chart of another implementation of a camera color adjusting method in accordance with the present invention.

If color adjusting is performed for this image sensor for the first time, a proportion coefficient under each light source to be tested needs to be calculated according to the pictures taken and stored for followed use. The specific method may be as shown in FIG. 2, including the following steps.

In step 201, the camera is controlled to shoot the test drawings under the predefined light source and the light source to be tested respectively to obtain test photos under the predefined light source and the light source to be tested respectively, that is, shooting the test drawings under all the light sources for color adjusting to obtain the test photos under each light source.

In step S202, RGB values of a first color block in each test photo are recorded.

RGB is a method for color encoding. With this encoding method, three variables are available for each color—red, green, and blue intensities.

For example, when the predefined light source is a TL84 light source and the light source to be testeds are a D65 light source and a CWF light source, the red, green and blue components of the RGB values of the first color block in the test photo under the TL84 light source may be R1, G1 and B1; the red, green and blue components of the RGB values of the first color block in the test photo under the D65 light source may be R2, G2 and B2, respectively; and the red, green and blue components of the RGB values of the first color block in the test photo under the CWF light source may be R3, G3, and B3, respectively.

In step S203, the proportion coefficient under the light source to be tested is calculated.

Specifically, the RGB values of the first color block in the test photo under the light source to be tested and the RGB values of the first color block in the test photo under the predefined light source may be calculated, so that the proportion coefficient of the image sensor of the camera is obtained under the light source to be tested.

The red, green and blue components of the proportion coefficient under the D65 light source are Ref_R2, Ref_G2 and Ref_B2, respectively. The red, green and blue components of the proportion coefficient under the CWF light source are Ref_R3, Ref_G3 and Ref_B3, respectively.

On this basis, the ratio of the RGB values of the first test drawing in the test photo under the light source to be tested to the RGB values of the first color block in the test photo under the predefined light source may be taken as the proportion coefficient under the light source to be tested.

Thus, Ref_R2=R2/R1, Ref_G2=G2/G1, Ref_B2=B2/B1, Ref_R3=R3/R1, Ref_G3=G3/G1, Ref_B3=B3/B1. Through this ratio operation, the proportion coefficient of the image sensor of the camera can be obtained under each light source to be tested.

In step S204, the proportion coefficient is stored.

The proportion coefficient can be stored for later direct invocation when color adjusting is performed for the camera of the image sensor with the same signal, which can effectively speed up the output of the image, thereby accelerating the process of color adjusting of the camera and improving the adjusting efficiency.

Further, in the case that the image sensor of the camera does not store the proportion coefficient under the light source to be tested, after step S204 is executed, step S102 may be performed, and step 105 may also be performed.

In step S102, the camera is controlled to shoot test drawings under the predefined light source to obtain test photos under the predefined light source. If the TL84 light source is a predefined light source, the test photo under the predefined light source is obtained by shooting a test drawing under the TL84 light source.

The test drawings may be, but are not limited to, 24 color cards. 24 color cards are composed of 24 color blocks developed by science experiments. These color blocks represent colors of particular importance to objects in nature, such as skin color, green of the leaves, and blue of the sky. These color blocks are not just similar in color to their counterparts, but reflect the same light as them in the visible spectrum. Because of this unique feature, a color block under any lighting and in any color regeneration process matches the color of its corresponding natural object.

In step S103, RGB values of each color block in the test photos under the predefined light source are acquired.

For example, the red, green and blue components of the RGB values of the first color block in the test photo under the TL84 light source may be respectively R1', G1' and B1', and the red, green and blue components of the RGB values of the second color block may be R1'', G1'' and B1'', respectively, In step S104, test photos corresponding to the light source to be tested are generated according to the RGB values of each color block and the proportion coefficient under each light source to be tested.

Specifically, for the same image sensor, different color blocks of the test drawing have the same proportion coefficient under the same light source to be tested.

Therefore, the RGB values of each color block can be respectively multiplied by the proportion coefficient corresponding to the light source to be tested to obtain the RGB values of each color block corresponding to the light source to be tested.

According to the RGB values corresponding to each color block under the light source to be testeds, a test photo under a corresponding light source to be tested is generated.

For example, the red, green and blue components of the RGB values of the first color block in the test photo under the D65 light source may be respectively R2', G2' and B2', and the red, green and blue components of the RGB values of the second color block may be R2'', G2'', and B2'' respectively. The red, green and blue components of the RGB values of the first color block in the test photo under the CWF light source may be respectively R3', G3' and B3', and the red, green and blue components of the RGB value of the second color block may be respectively R3'', G3'' and B3''. The specific calculation method may be: R2'=R1'*Ref_R2=R1'*R2/R1, G2'=G1'*Ref_G2=G1'*G2/G1, B2'=B1'*Ref_B2=B1'*B2/R1; R2''=R1''*Ref_R2=R1''*R2/R1, G2''=G1''*Ref_G2=G1''*G2/G1, B2''=B1''*Ref_B2= B1''*B2/B1; R3'=R1'*Ref_R3=R1'*R3/R1, G3'=G1'*Ref_G3=G1'*G3/G1, B3'=B1'*Ref_B3= B1'*B3/R1; R3''=R1''*Ref_R3=R1''*R3/R1, G2''= G1''*Ref_G3=G1''*G3/G1, B3''=B1''*Ref_B3=B1''*B2/B1.

In this way, by analogy, the RGB values of each color block corresponding to the light source to be tested can be calculated through the above formula.

According to the above RGB values, it is possible to, but not limited to, find a specific color of each color block by searching a lookup table that reflects the relationship between RGB values and colors, and then generate a test photo under the corresponding light source.

In step S105, color adjustment is performed for the camera according to all the test photos.

All the test photos obtained through the above steps, including the test photos under the predefined light source and the test photos under the light source to be testeds, will be input to an adjusting tool, and color adjustment will be performed for the camera according to the photo effect.

Figure 3:
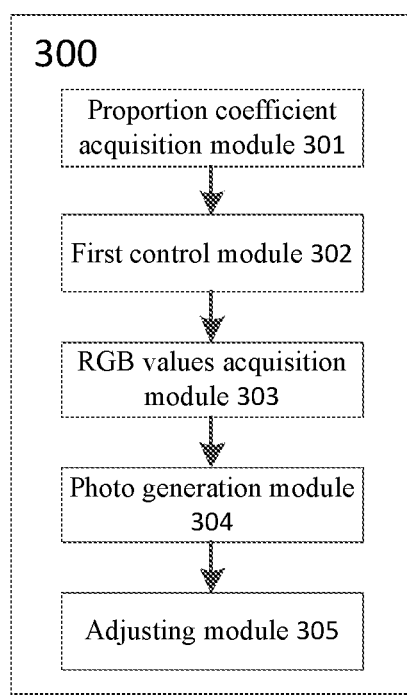
FIG. 3 is a block diagram of an implementation of a camera color adjusting apparatus in accordance with the present invention.

The present invention also provides a camera color adjusting apparatus. FIG. 3 is a block diagram of an implementation of the camera color adjusting apparatus.

As shown in FIG. 3, the apparatus 300 comprises: a proportion coefficient acquisition module 301 configured for acquiring a stored proportion coefficient of an image sensor of a camera under a light source to be tested; a first control module 302 configured for controlling the camera to shoot test drawings including color blocks under a predefined light source to obtain test photos under the predefined light source; an RGB values acquisition module 303 configured for acquiring RGB values of each color block in the test photos under the predefined light source; a photo generation module 304 configured for generating test photos corresponding to the light source to be tested according to the RGB values of each color block and the proportion coefficient under each light source to be tested; and an adjusting module 305 configured for performing color adjustment for the camera according to all the test photos.

Further, the apparatus 300 comprises: a second control module configured for controlling the camera to shoot the test drawings under the predefined light source and the light source to be tested respectively to obtain test photos under the predefined light source and the light source to be tested respectively; a recording module configured for recording RGB values of a first color block in each test photo; a proportion coefficient calculation module configured for calculating by using the RGB values of the first color block in the test photo under the light source to be tested and the RGB values of the first color block in the test photo under the predefined light source to obtain a proportion coefficient of the image sensor the camera under the light source to be tested; and a storage module configured for storing the proportion coefficient of the image sensor of the camera under the light source to be tested.

On the basis of the above, the proportion coefficient calculation module is configured for: taking the ratio of the RGB values of the first color block in the test photo under each light source to be tested to the RGB values of the first color block in the test photo under the predefined light source as the proportion coefficient of the corresponding light source to be tested.

Specifically, the photo generation module comprises: an RGB values calculation unit configured for multiplying the RGB values of each color block by the proportion coefficient of the corresponding light source to be tested respectively to obtain RGB values of each color block under the corresponding light source to be tested; and a photo generation unit configured for generating the test photos corresponding to the light source to be tested according to the RGB values of each color block under the corresponding light source to be tested.

The present invention may be a system, a method and/or a computer program product. The computer program product may include a computer-readable storage medium loaded with computer-readable program instructions causing a processor to realize the aspects of the present invention.

The computer-readable storage medium may be a physical device that may maintain and store instructions used by an instruction-executable device. For example, the computer-readable storage medium may be, but is not limited to, an electric storage device, a magnetic storage device, an optical storage device, an electromagnetic storage device, a semiconductor storage device, or any suitable combination thereof. More specific examples (non-exhaustive lists) of the computer-readable storage medium include a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disc (DVD), a memory stick, a floppy disk, a mechanical encoding device, a punched card or a groove bulged structure that stores instructions thereon, and any suitable combination thereof. The computer-readable storage medium used herein is not interpreted as an instantaneous signal, such as radio waves or other freely propagated electromagnetic waves, electromagnetic waves propagated through a waveguide or other transmission media (e.g., optical pulses of optical fiber cables), or electrical signals transmitted by wires.

The computer-readable program instructions described herein may be downloaded from a computer-readable storage medium to respective computing/processing devices or downloaded to an external computer or external storage device via a network, such as the Internet, a local area network, a wide area network and/or a wireless network. The network may include copper transmission cables, optical fiber transmission, wireless transmission, a router, a firewall, a switch, a gateway computer and/or an edge server. A network adapter card or network interface in each computing/processing device receives computer-readable program instructions from the network and forwards the computer-readable program instructions to be stored in the computer-readable storage medium in each computing/processing device.

The computer-readable program instructions for executing the operations of the present invention may be assembly instructions, instruction set architecture (ISA) instructions, machine instructions, machine-related instructions, microcodes, firmware instructions, state setting data, or source codes or object codes written by any combination of one or more programming languages. The programming languages include object-oriented programming languages, such as Smalltalk, $C^{++}$ and the like, as well as conventional procedural programming languages, such as "C" language or similar programming languages. The computer-readable program instructions may be completely executed on a user's computer, partially executed on the user's computer, executed as a separate software package, executed on the user's computer and a remote computer, or completely executed on the remote computer or a server. When the remote computer is referred to, the remote computer may be connected to a user computer via any kind of network, including a local area network (LAN) or a wide area network (WAN), or may be connected to an external computer (e.g., via the Internet provided by an Internet service provider). In some embodiments, an electronic circuit, such as a programmable logic circuit, a field programmable gate array (FPGA) or a programmable logic array (PLA) is customized in a personalized manner by utilizing state information of the computer-readable program instructions. The electronic circuit may execute the computer-readable program instructions, implementing various aspects of the present invention.

Various aspects of the present invention are described herein with reference to flow charts and/or block diagrams of the method, device (system) and computer program product according to the embodiments of the present invention. It should be understood that flow charts and/or each block in the block diagrams, as well as the flow charts and/or the combinations of all blocks in the block diagrams, may be implemented by computer-readable program instructions.

These computer-readable program instructions may be provided to a processor of a general purpose computer, a special purpose computer, or other programmable data processing devices to generate a machine, so that when these instructions are executed by the processor of the computer or the other programmable data processing devices, a device for realizing functions/actions designated in the flow charts and/or in one or more blocks in the block diagrams. These computer-readable program instructions may also be stored in a computer-readable storage medium that causes the computer, the programmable data processing device and/or other devices to operate in a particular manner. Thus, the computer-readable medium stored with the instructions includes a manufacture article that includes instructions for realizing functions/actions designated in the flow charts and/or in one or more blocks in the block diagrams.

These computer program instructions may further be loaded into a computer or other programmable data processing devices or other devices, such that a series of operating steps may be performed on the computer or other programmable data processing devices or other devices, so as to generate processes realized by the computer, and functions/actions designated in one or more blocks in the flowcharts and/or block diagrams may be provided by the instructions executed on the computer or other programmable data processing devices or other devices.

The flowcharts and block views in the accompanying drawings show the structures, functions and operations that may be realized by the systems, methods and computer program products of this invention. Each block in the flowcharts and block views may represent one module, one program segment or a part of instructions, which comprise(s) one or more executable instructions for realizing predetermined logical functions. It should also be noted that in some alternative implementations, the function described in one block may be realized in a sequence difference from that described in the drawings. For example, two consecutive blocks may be executed substantially in parallel, and may be executed in an inverse sequence, depending on the related functions. It should be noted that each block or a combination of the blocks in the flowcharts and/or block views may be realized by specific software systems for executing predetermined functions or operations, or by a combination of specific hardware and computer instructions. Those skilled in the art should well know that the realization manners by hardware, or software or a combination thereof are all equivalents.

The above has described the embodiments of this invention. But the above descriptions are only exemplary rather than exhaustive, and are not intended to limit the disclosed embodiments. Those skilled in the art should clearly understand that modifications can be made to the above embodiments without departing from the scope and spirit of the embodiments of this invention. The terms selected in this disclosure are intended to best explain the principles of the embodiments, applications or improvements to the existing technologies, or to enable those skilled in the art/related arts to better understand the embodiments of this invention. The scope of this invention is defined by the appended claims.

What is claimed is:

1. A camera color adjusting method, the method comprising:
    acquiring stored proportion coefficient of an image sensor of a camera under a light source to be tested;
    controlling the camera to shoot test drawings including color blocks under a predefined light source to obtain test photos under the predefined light source;
    acquiring RGB values of each color block in the test photos under the predefined light source;
    generating test photos corresponding to the testing light source according to the RGB values of each color block and the proportion coefficient under each light source to be tested; and
    performing color adjustment for the camera according to all the test photos,
    wherein generating test photos corresponding to the testing light source according to the RGB values of each color block and the proportion coefficient under each testing light source comprises:
        multiplying the RGB values of each color block by the proportion coefficient of the corresponding testing light source respectively to obtain RGB values of each color block under the corresponding testing light source; and
        generating the test photos corresponding to the testing light source according to the RGB values of each color block under the corresponding testing light source.

2. The method according to claim 1, wherein the method further comprises:
    controlling the camera to shoot the test drawings under the predefined light source and the light source to be tested respectively to obtain test photos under the predefined light source and the testing light source respectively;
    recording RGB values of a first color block in each test photo;
    calculating by using the RGB values of the first color block in the test photo under each light source to be tested and the RGB values of the first color block in the test photo under the predefined light source to obtain a proportion coefficient of the image sensor the camera under each testing light source; and
    storing the proportion coefficient of the image sensor of the camera under the testing light source.

3. The method according to claim 2, wherein calculating by using the RGB values of the first color block in the test photo under each testing light source and the RGB values of the first color block in the test photo under the predefined light source to obtain a proportion coefficient of the image sensor the camera under each testing light source comprises:
    taking the ratio of the RGB values of the first color block in the test photo under each testing light source to the RGB values of the first color block in the test photo under the predefined light source as the proportion coefficient of the corresponding testing light source.

4. A non-transitory and computer readable storage medium storing program codes for performing the method according to claim 1.

5. A camera color adjusting apparatus comprising a memory and a processor, the memory having stored thereon instructions which, when executed by the processor, cause the processor to:
    acquire a stored proportion coefficient of an image sensor of a camera under a testing light source;
    control the camera to shoot test drawings including color blocks under a predefined light source to obtain test photos under the predefined light source;
    acquire RGB values of each color block in the test photos under the predefined light source;
    generate test photos corresponding to the testing light source according to the RGB values of each color block and the proportion coefficient under each testing light source; and
    perform color adjustment for the camera according to all the test photos,
    wherein to generate test photos corresponding to the testing light source according to the RGB values of each color block and the proportion coefficient under each testing light source comprises:
        multiplying the RGB values of each color block by the proportion coefficient of the corresponding testing light source respectively to obtain RGB values of each color block under the corresponding testing light source; and generating the test photos corresponding to the testing light source according to the RGB values of each color block under the corresponding testing light source.

6. The apparatus according to claim 5, wherein the memory has stored thereon instructions which, when executed by the processor, cause the processor to further:

control the camera to shoot the test drawings under the predefined light source and the testing light source respectively to obtain test photos under the predefined light source and the testing light source respectively;

record RGB values of a first color block in each test photo;

calculate by using the RGB values of the first color block in the test photo under the testing light source and the RGB values of the first color block in the test photo under the predefined light source to obtain a proportion coefficient of the image sensor the camera under the testing light source; and store the proportion coefficient of the image sensor of the camera under the testing light source.

7. The apparatus according to claim 6, wherein the memory has stored thereon instructions which, when executed by the processor, cause the processor to further:

take the ratio of the RGB values of the first color block in the test photo under each testing light source to the RGB values of the first color block in the test photo under the predefined light source as the proportion coefficient of the corresponding testing light source.

\* \* \* \* \*